United States Patent

Nakai et al.

[11] Patent Number: 5,666,582
[45] Date of Patent: Sep. 9, 1997

[54] CAMERA CASING STRUCTURE

[75] Inventors: Koji Nakai, Kamiina-gun; Hiroyuki Sakayauchi, Ina; Hiromi Ito, Kamiina-gun, all of Japan

[73] Assignee: Olympus Optical Co., Ltd., Tokyo, Japan

[21] Appl. No.: 630,809

[22] Filed: Apr. 10, 1996

[30] Foreign Application Priority Data

May 12, 1995 [JP] Japan .................... 7-114940

[51] Int. Cl.$^6$ .......................... G03B 17/02
[52] U.S. Cl. .................. 396/419; 396/535
[58] Field of Search .............. 354/288, 81, 293; 352/242, 243; 396/419, 428, 535

[56] References Cited

U.S. PATENT DOCUMENTS 4,417,796  11/1983  Sugiura et al. .................. 354/288

FOREIGN PATENT DOCUMENTS 61-190537  11/1986  Japan.

Primary Examiner—A. A. Mathews
Attorney, Agent, or Firm—Kenyon & Kenyon

[57] ABSTRACT

A camera casing structure for fixing thereto a tripod connecting member. A camera structure is described with a front cover having an inverted U-shaped first supporting member including a fitting hole in the direction of an optical axis and a semi-circular recess; a rear cover having an inverted U-shaped second supporting member including a fitting hole in the direction of the optical axis and a semi-circular recess; and a tripod connecting member having a substantially cylindrical member including an inner female threaded screw hole and partial flanges symmetrically protruding on opposite sides of the peripheral surface of the substantially cylindrical member for fitting. The flanges fit into the fitting holes, respectively, so that the tripod connecting member can be nipped and fixed by the first and second supporting members.

22 Claims, 5 Drawing Sheets

CAMERA CASING STRUCTURE

FIELD OF THE INVENTION

The present invention relates to a camera, more particularly, to a camera comprising a tripod connecting member for connecting a tripod thereto.

BACKGROUND INFORMATION

When a picture is taken with a camera using a self-timer or a long time exposure, the camera needs to be fixed to a tripod or the like. For this purpose, a tripod connecting member having a female threaded screw hole is typically provided on the base of the camera.

Usually, the tripod connecting member is fixed to the casing of the camera, or the like, by a screw.

Japanese Laid Open Utility Model Application Publication No. Sho 61-190537 (the "Japanese '537 reference") discloses an example of such a fixing structure in which the camera body is formed by integrating a supporting metal board with a plastic material board. The supporting metal board has a front board unit for lens attachment on its front surface and a film guide rail on its rear surface. The base of the camera is formed by the plastic material board. A metal tripod connecting member having a threaded screw hole is provided on the base.

The metal tripod connecting member described in the Japanese '537 reference is formed by a substantially rectangular board member. In order to maintain connection strength between the tripod and the camera, when the tripod is connected, the metal tripod connecting member is fixed to the base of the camera body by four screws through four threaded screw holes which are respectively provided at four corners on the metal tripod connecting member.

In the apparatus described in the Japanese '537 reference, however, a plurality of screws are required to maintain connection strength between the tripod and the camera. The price of the screws and the assembly cost are increased in proportion to the number of the screws used. Therefore, from the point of view of cost, there is a disadvantage in using screws to maintain the connection strength between the tripod connecting member and the camera.

Also, the use of screws is disadvantageous from the point of view of compactness of the camera design because extra space is required for the screw connection.

If the tripod connecting member is integrated with a camera casing which is made of a plastic material or the like, a metal mold structure for tapping must be provided within a metal mold for forming the camera casing. Thus, the metal mold becomes large and complex by structure, requiring extra manufacturing expenses for the special metal mold. It is difficult to make many camera casings using one set of the metal mold, and therefore, the forming process will take a long time. As such, the use of screws is also disadvantageous for mass production.

Additionally, when the tripod connecting member is integrated with the camera casing, if the tripod connecting member is damaged, it will be necessary to replace the entire camera casing for repair. Thus, the cost of repair will be high.

SUMMARY OF THE INVENTION

An object of the present invention is to provide a camera comprising a low-priced tripod connecting member which is easy to replace and sufficiently strong for maintaining the connection.

In order to achieve this object, a camera in accordance with the present invention comprises a first structural member, a second structural member combined with the first structural member for forming a camera casing, including a tripod connecting member having a tripod connecting screw portion, and a connecting means for causing the tripod connecting member to be nipped by the first and second structural members, wherein the first structural member forms a first camera casing member, and wherein the second structural member forms a second camera casing member.

DETAILED DESCRIPTION

Figure 1:
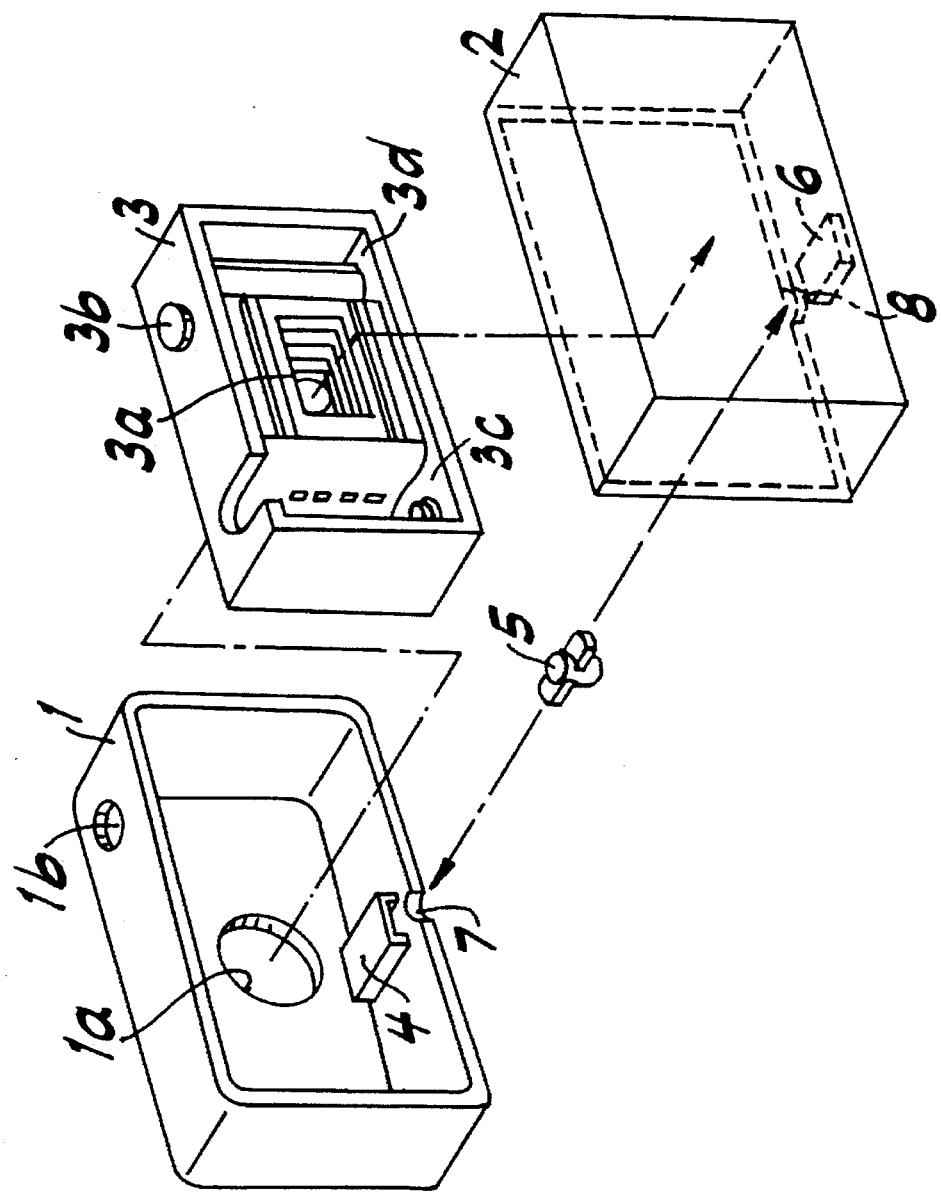
FIG. 1 is an exploded perspective view of a camera of a first embodiment of the present invention.
Figure 2:
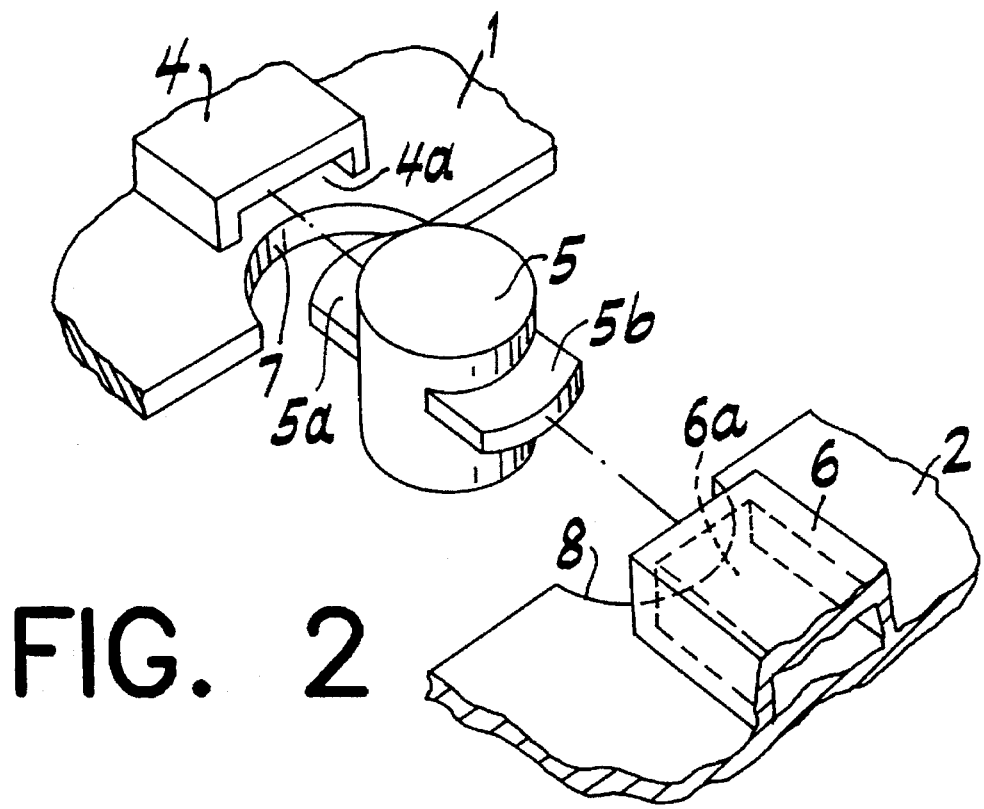
FIG. 2 is a partially exploded perspective view of the camera of the first embodiment showing a tripod connecting member before being assembled with other members of the camera.
Figure 3:
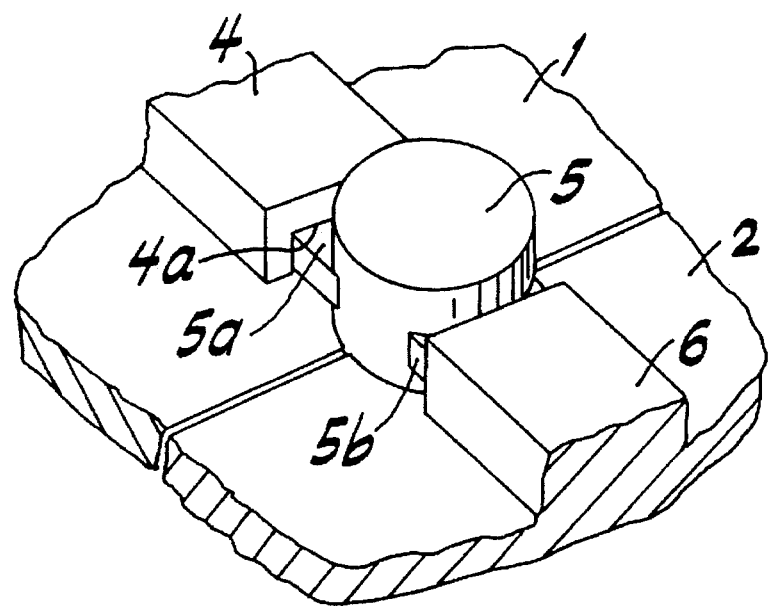
FIG. 3 is a partially enlarged perspective view of the camera of the first embodiment showing the tripod connecting member nipped and fixed with other members of the camera.

FIGS. 1, 2 and 3 show a first embodiment of the present invention. FIG. 1 is an exploded perspective view of a camera showing the camera assembly before a tripod connecting member is nipped and fixed in place.

The camera comprises a camera body 3 having a release button 3b, an aperture 3a, a film cartridge chamber 3c on the left side of the aperture 3a, and a spool chamber on the right side of the aperture 3a. The camera body 3 is formed by a front cover 1 and a rear cover 2. The front cover 1, as a first structural member and a front casing member, has a circular hole 1a in which a lens barrel is inserted and a hole 1b in which the release button 3b is inserted. The rear cover 2 acts as a second structural member and a rear casing member.

The front cover 1 includes a first supporting member 4, as a first supporting portion and as part of a connecting means, and a semi-circular recess 7. The rear cover 2 includes a second supporting member 6, as a second supporting portion and as part of the connecting means, and a semi-circular recess 8. A tripod connecting means 5 is nipped and fixed in place by the first and second supporting members 4 and 6 and by the semi-circular recesses 7 and 8.

As shown in greater detail in FIG. 2, the tripod connecting member 5 comprises a substantially cylindrical member having a female threaded screw hole (e.g., 5c, see FIG. 4) as a screw portion for the tripod connection. A partial flange 5a, as a first fitting portion, and a partial flange 5b, as a second fitting portion, protrude from the substantially cylindrical member 5 at diametrically opposite positions on its periphery.

The first and second supporting members 4 and 6 protrude in an inverted U shape from the inner surfaces of the bases of the front and rear covers 1 and 2, respectively, to form fitting holes 4a and 6a. The fitting holes 4a and 6a are located in the direction of an optical axis of the camera and are of a size and shape adapted for receiving therein the partial flanges 5a and 5b of the tripod connecting member 5.

The partial flanges 5a and 5b have the same shape and each can fit into either the fitting hole 4a or the fitting hole 6a. As such, the orientation, with respect to the longitudinal axis of the connecting member 5, of the partial flanges 5a and 5b can be in either one of two directions when the tripod connecting member is assembled, thus simplifying the assembly process.

A process for fixing the tripod connecting member 5 to the camera will now be described.

When the front cover 1 and the rear cover 2 are brought together, with the camera body 3 therein, the partial flange 5a of the tripod connecting member 5 is fitted into the fitting hole 4a of the first supporting member 4 in the direction of the optical axis, and similarly, the partial flange 5b of the tripod connecting member 5 is fitted into the fitting hole 6a of the second supporting member 6.

As shown in FIGS. 1, 2 and 3, the partial flanges 5a and 5b are slid, up to a predetermined position, into the fitting holes 4a and 6a of the first and second supporting members 4 and 6, respectively, at which point the recesses 7 and 8 abut against the circumferential periphery of the tripod connecting member 5. In this state, the position of the tripod connecting member 5 is fixed such that the position of the member in a direction transverse to the optical axis of the camera is set by the walls of the fitting holes 4a and 6a, and the position of the connecting member in the direction of the optical axis is set by the first and second supporting members 4 and 6 and by the recesses 7 and 8 provided in the bases of the front and rear covers 1 and 2.

In accordance with the first embodiment of the present invention, the tripod connecting member can be assembled with the other camera components simply by nipping the tripod connecting member with the first and second supporting members, without using screws or the like. Therefore, the screws themselves and the screwing process are not necessary, thereby reducing the cost of producing the camera.

Furthermore, compared to assemblies in which the tripod connecting member is fixed to the camera body by screws, the structure of the present invention saves space so that the camera can be designed compactly.

Moreover, since the camera casing members such as the front and rear covers are formed separately from the tripod connecting member, the structure of the metal mold for forming the camera casing members becomes simpler so that the cost for the metal mold can be reduced. Moreover, the number of camera casing members formed by one set of metal molds can be increased, and the time for forming can be shortened. Thus, the first embodiment of the present invention has many advantages.

Thus, the present invention provides a camera comprising a tripod connecting member which is manufacturable at low cost, is compact, and is tough enough to provide the requisite connection strength.

Figure 4:
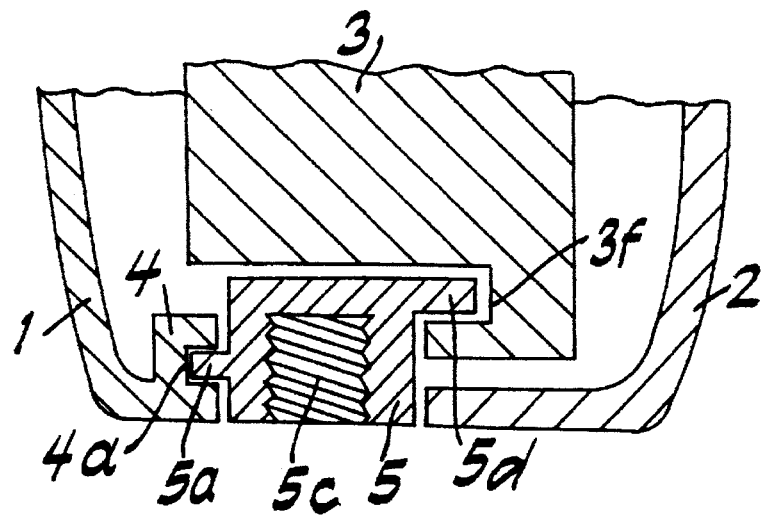
FIG. 4 is a longitudinal section view of the base of a variant of the camera of the first embodiment including a modified tripod connecting member.

FIG. 4 is directed to a modification of the first embodiment and shows a longitudinal section of the base of a camera including a modified tripod connecting member 5.

As shown in FIG. 4, the modified tripod connecting member 5 comprises a protrusion 5d, which is a second fitting portion, protruding from an upper end surface of the member 5 at a position diametrically opposite the partial flange 5a.

The protrusion 5d is a means for connecting the member 5 to the camera by being fitted into a fitting recess 3f, which acts as a second supporting member, located in the lower part of the camera body 3. The member 5 is thereby fixed in place in the camera between the supporting members 4 and 3f.

In the modified embodiment of FIG. 4, no second supporting member 6 is provided within the rear cover 2. The front cover 1 is a first structural member and the camera body 3 is a second structural member. When the tripod connecting member 5 is fixed in place, the tripod connecting member 5 is nipped between a first supporting member 4 of the front cover 1 and the fitting recess 3f of the camera body 3.

The modified embodiment of FIG. 4 has the same effect as the first embodiment while allowing the tripod connecting member 5 to be fixed between the front cover 1 and the camera body 3. Although the tripod connecting member 5 is shown in FIG. 4 as being fixed between the front cover 1 and the camera body 3, it should be clear that the tripod connecting member 5 can be fixed between the camera body 3 and the rear cover 2.

Figure 5:
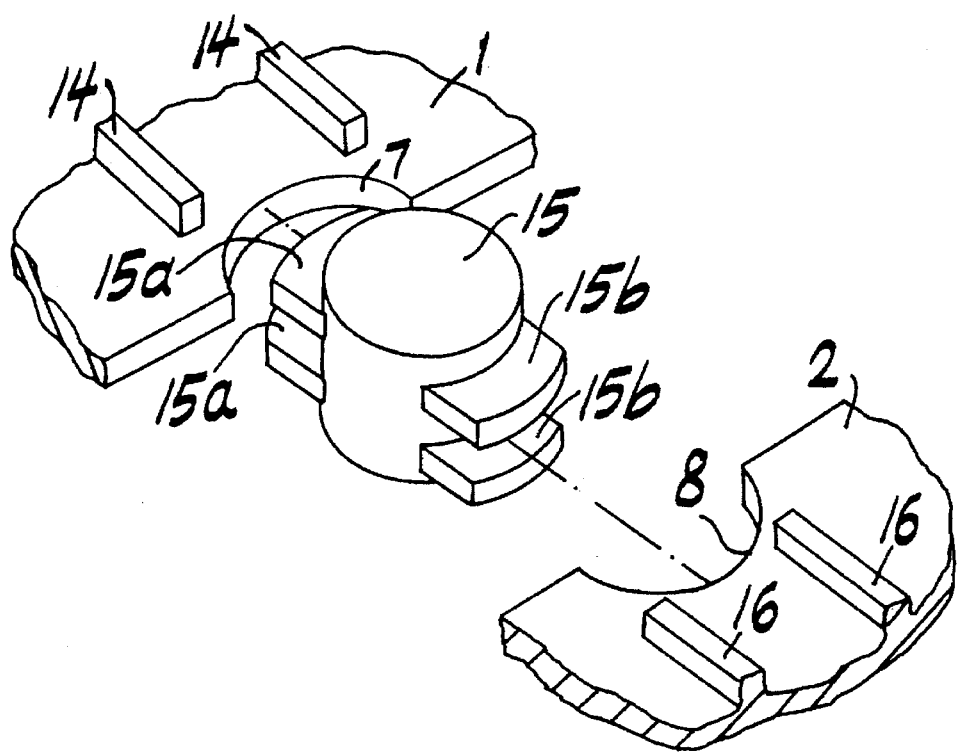
FIG. 5 is a partially exploded perspective view of a camera of a second embodiment of the present invention showing a tripod connecting member before being nipped and fixed in place.

FIG. 5 is a partially exploded perspective view of a tripod connecting member 15, before being nipped and fixed, in accordance with a second embodiment of the present invention. The second embodiment will be described mainly with respect to how it differs from the first embodiment, omitting the detailed description of the same parts as those of the first embodiment.

In the second embodiment, the tripod connecting member 15 comprises a substantially cylindrical member having an inner female threaded screw hole. A pair of partial flanges 15a, forming a first fitting portion, and a pair of partial flanges 15b, forming a second fitting portion, protrude from the substantially cylindrical member at diametrically opposite positions on its periphery. The partial flanges 15a are spaced from each other in the vertical direction, as are the partial flanges 15b. The vertical space between the partial flanges 15a and the vertical space between the partial flanges 15b are determined in accordance with the thicknesses of a front cover 1 and a rear cover 2 such that the front cover 1 and the rear cover 2 can be fit in the space between the partial flanges 15a and the space between the partial flanges 15b, respectively.

The front cover 1 comprises a semi-circular recess 7 and a first supporting member 14 which acts as a connecting means and a first supporting portion. The rear cover 2 comprises a semi-circular recess 8 and a second supporting member 16 which acts as a connecting means and a second supporting portion. The tripod connecting member 15 is fixed in place as it is nipped by the front cover 1 and the rear cover 2.

The supporting members 14 and 16 are each formed by a pair of parallel, elongated and rail-shaped members extending substantially in the direction of the optical axis of the camera. Each of the pairs of rail-shaped members are spaced so as to receive therebetween the partial flanges 15a and 15b for fixing the tripod connecting member 15 in place.

A process of fixing the tripod connecting member 15 on the camera will now be described.

When the front cover 1 and the rear cover 2 are brought together, the tripod connecting member 15 is fitted on the base of the front cover 1 in the direction of the optical axis by nipping the base of the front cover 1 by the pair of partial flanges 15a. The tripod connecting member 15 is then further pushed in so that the partial flanges 15a are positioned between the pair of rail-shaped members of the first supporting member 14. In the same way, the pair of partial flanges 15b are fitted on the rear cover 2.

When the pairs of partial flanges 15a and 15b are fitted in up to predetermined positions between the pair of rail-shaped members of the first supporting member 14 and between the pair of rail-shaped members of the second supporting member 16, respectively, the position of the tripod connecting member 15 is fixed. So fixed, the vertical position of the member 15 is set by the bases of the front and rear covers 1 and 2 nipped by the pairs of partial flanges 15a and 15b, respectively. The position of the member 15 in the direction of the optical axis is set by the recesses 7 and 8 formed in the bases of the front and rear covers 1 and 2, respectively, whereas the position of the member 15 in a horizontal direction perpendicular to the optical axis is set by the pairs of rail-shaped members of the first and second supporting members 14 and 16.

The second embodiment has the same effect as the first embodiment. Further, the second embodiment has the advantage of a simpler structure because the supporting member can be simpler.

Figure 6:
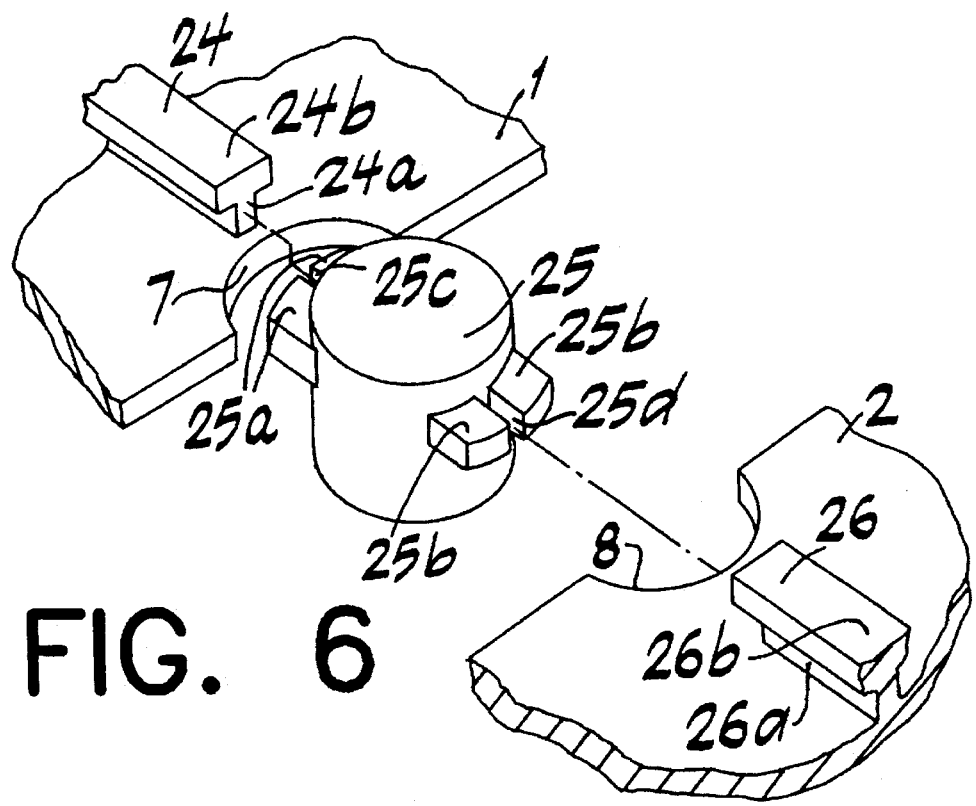
FIG. 6 is a partially exploded perspective view of a camera of a third embodiment of the present invention showing a tripod connecting member before being nipped and fixed in place.

FIG. 6 is a partially exploded perspective view of a tripod connecting member 25, before being nipped and fixed, in accordance with a third embodiment of the present invention. The third embodiment will be described mainly with respect to how it differs from the previously described embodiments, omitting the detailed description of the same parts as those of the previously described embodiments.

In the third embodiment, the tripod connecting member 25 comprises a substantially cylindrical member having an inner female threaded hole. A pair of partial flanges 25a forming a first fitting portion, and a pair of partial flanges 25b forming a second fitting portion protrude from the substantially cylindrical member 25 at diametrically opposite positions on the periphery of the member. Notches 25c and 25d are provided between the pair of partial flanges 25a and between the pair of partial flanges 25b, respectively.

In the embodiment of FIG. 6, the front cover 1 comprises a first supporting member 24, as part of a means for connecting and supporting the member 25, and a semi-circular recess 7. Similarly, the rear cover 2 comprises a second supporting member 26 and a semi-circular recess 8. The tripod connecting member 25 is nipped by both the first supporting member 24 and the second supporting member 26 and fixed thereby.

The first supporting member 24 comprises a guiding member 24a and a stopping portion 24b. The second supporting member 26 comprises a guiding portion 26a and a stopping portion 26b. The guiding portions 24a and 26a protrude upward from the bases of the front and rear covers 1 and 2, respectively, and are elongated along the direction of an optical axis. The stopping portions 24b and 26b project laterally with respect to the guiding members 24a and 26a, respectively. Thus, each of the supporting members 24 and 26 is substantially in the shape of a rail with a T-shaped cross-section. The thicknesses of the guiding portions 24a and 26a are selected so as to fit in the notches 25c and 25d and to thereby keep the member 25 from rotating. The heights of the lower surfaces of the stopping portions 24b and 26b from the bases of the front and rear covers 1 and 2, respectively, are set so that the pairs of partial flanges 25a and 25b are vertically nipped therebetween.

A process for fixing the tripod connecting member 25 to the camera will now be described.

When the front cover 1 and the rear cover 2 are brought together, the guiding portion 24a of the first supporting member 24 is slid into the notch 25c of the pair of partial flanges 25a of the tripod connecting member 25. Similarly, the guiding portion 26a of the second supporting member 26 is slid into the notch 25d of the pair of partial flanges 25b of the tripod connecting member 25.

When the pairs of partial flanges 25a and 25b are fitted in up to predetermined positions with the guiding portions 24a and 26a of the first and second supporting members 24 and 26 nipped by the pairs of the partial flanges 25a and 25b, respectively, the position of the tripod connecting member 25 is fixed so that its vertical position is set by the bases of the front and rear covers 1 and 2 and the stopping portions 24b and 26b, its position in the direction of the optical axis is set by the recesses 7 and 8, in the bases of the front and rear covers 1 and 2, respectively, and its position in a horizontal direction perpendicular to the optical axis is set by the guiding portions 24a and 26a.

The third embodiment has substantially the same effect as the second embodiment.

Figure 7:
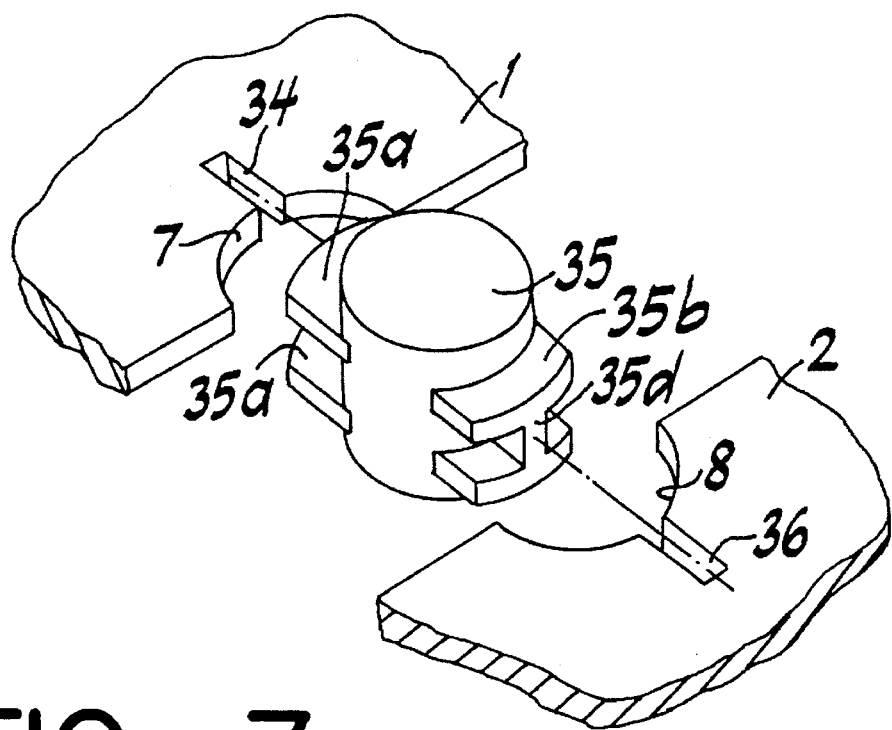
FIG. 7 is a partially exploded perspective view of a camera of a fourth embodiment of the present invention showing a tripod connecting member before being nipped and fixed in place.

FIG. 7 is a partially exploded perspective view of a tripod connecting member 35, before being nipped and fixed, in accordance with a fourth embodiment of the present invention. The fourth embodiment will be described mainly with respect to its differences with the previously described embodiments, while omitting the detailed description of the same parts as those of the previously described embodiments.

In the fourth embodiment, the tripod connecting member 35 comprises a substantially cylindrical member having an inner female threaded screw hole. A pair of partial flanges 35a forming a first fitting portion, and a pair of partial flanges 35b forming a second fitting portion protrude from the substantially cylindrical member at diametrically opposite positions on its periphery. The partial flanges 35a are spaced from each other in the vertical direction while the partial flanges 35b are spaced in the same manner. The vertical space between the partial flanges 35a and the vertical space between the partial flanges 35b are determined in accordance with the thickness of the front cover 1 and the rear cover 2 so that the front cover 1 and the rear cover 2 can be fit in the space between the partial flanges 35a and the space between the partial flanges 35b, respectively. The pairs of the partial flanges 35a and 35b are provided with coupling portions 35d (only the coupling portion of the partial flanges 35b is shown in the perspective view of FIG. 7).

The front cover 1 is provided with a semi-circular recess 7, in which a notch 34, as a connecting means and a first supporting portion, is formed in the direction of the optical axis of the camera. Similarly, the rear cover 2 is provided with a semi-circular recess 8, in which a notch 36, as the connecting means and a second supporting portion, is formed in the direction of the optical axis. The notches 34 and 36 have such widths that the coupling portions 35d can be fit in the notches 34 and 36, respectively and fixed.

A process for fixing the tripod connecting member 35 to the camera will now be described.

When the front cover 1 and the rear cover 2 are integrated with each other, the base of the front cover 1 is slid, in the direction of the optical axis, into the space between the pair of partial flanges 35a. At this time, the (hidden) coupling portion 35d of the partial flanges 35a is fit into the notch 34.

Similarly, the base of the rear cover 2 is slid, in the direction of the optical axis, into the space between the pair of partial flanges 35b. At this time, the coupling portion 35d is fit into the notch 36.

When the coupling portions 35d are fit in the notches 34 and 36 up to predetermined positions, respectively, the position of the tripod connecting member 35 is such that its vertical position is defined by the bases of the front and rear covers 1 and 2 nipped by the pairs of the partial flanges 35a and 35b, respectively, its position in the direction of the optical axis is defined by the recesses 7 and 8 in the bases of the front and rear covers 1 and 2, respectively, and its position in a horizontal direction perpendicular to the optical axis is defined by the notches 34 and 36 in which the coupling portions 35d are fitted, respectively.

The fourth embodiment has substantially the same effect as the second embodiment. Moreover, the fourth embodiment has the further advantage of allowing for even simpler structures for the front and rear covers 1 and 2.

Figure 8:
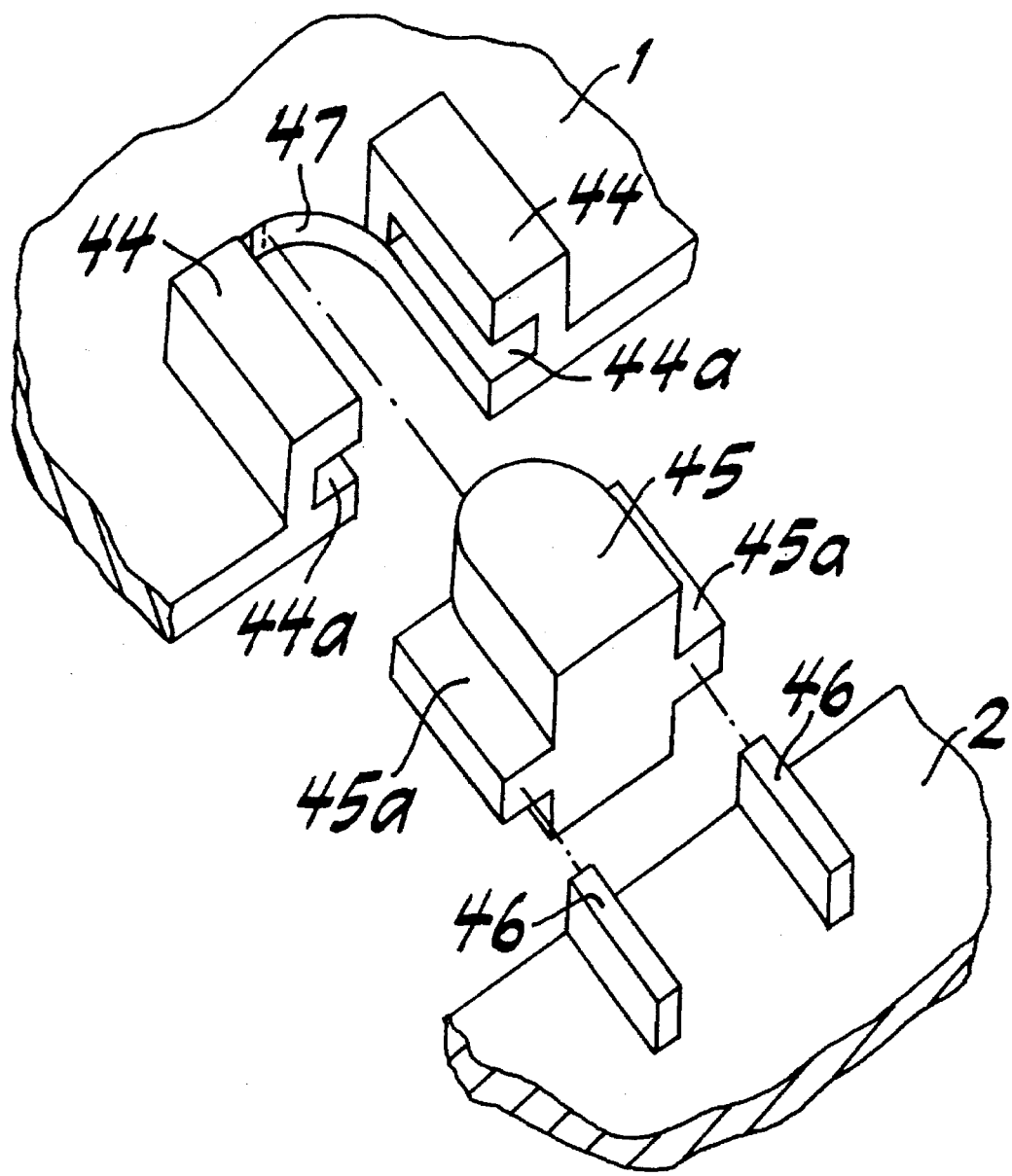
FIG. 8 is a partially exploded perspective view of a camera of a fifth embodiment of the present invention showing a tripod connecting member before being nipped and fixed in place.

FIG. 8 is a partially exploded perspective view of a tripod connecting member 45, before being nipped and fixed, in accordance with a fifth embodiment of the present invention. The fifth embodiment will be described mainly with respect to how it differs from the previously described embodiments, while omitting the detailed description of the same parts as those of the previously described embodiments.

In the fifth embodiment, the tripod connecting member 45 comprises a substantially D-shaped member, when viewed from its top, which has a substantially cylindrical surface on the side of the front cover 1 and a substantially rectangular plane on the side of the rear cover 2. The substantially D-shaped member has an inner female threaded screw hole. A pair of guiding projections 45a protrude from opposite sides of the substantially D-shaped member in a horizontal direction, perpendicular to an optical axis of the camera. The front cover 1 is provided with a D-shaped recess 47 which is a connecting means and into which the entire tripod connecting member 45 is fitted. A pair of first supporting members 44 which act as the connecting means and a first connecting portion are provided on opposite sides of the recess 47. Each of the first supporting members 44 is provided with an engaging recess 44a having a size and shape adapted to receive and fix one of the guiding projections 45a on the tripod connection member 45.

The rear cover 2 comprises two substantially rectangular second supporting members 46, as the connecting means and a second supporting portion, which are spaced apart from each other in mutual parallelism along a transverse direction. The shapes of the second supporting members 46 and the space therebetween are such that the second supporting members 46 abut on the rear end surfaces of the guiding projections 45a of the tripod connecting member 45 to define its position in the direction of the optical axis.

When the front cover 1 and the rear cover 2 are brought together, the guiding projections 45a of the tripod connecting member 45 are slid into the fitting recesses 44a of the first supporting members 44. Simultaneously, the substantially cylindrical surface on the side of the tripod connecting member 45 is fit into the D-shaped recess 47 in the direction of the optical axis so that the substantially whole tripod connecting member 45 can be properly fit into the U-shaped recess 47. When the rear cover 2 is fixed to the front cover 1, the second supporting members 46 abut the end surfaces of the guiding projections 45a.

In this state, the position of the tripod connecting member 45 is defined such that its vertical position is defined by the fitting recesses 44a of the first supporting members 44, its front position in the direction of the optical axis is defined by the D-shaped recess 47 formed in the base of the front cover 1 and front inner surfaces of the fitting recesses 44a in the direction of optical axis, its rear position in the direction of the optical axis is defined by the supporting members 46 formed on the rear cover 2, and its position in a horizontal direction perpendicular to the optical axis is defined by the D-shaped recess 47 and inner side surfaces of the fitting recesses 44a of the first supporting members 44.

The fifth embodiment has substantially the same effects as the first embodiment. Further, when the tripod connecting member is fixed, an operation for fitting the tripod connecting member is required only on the side of the front cover so that the side of the tripod connecting member on the side of the rear cover can be fit by abutting.

In the fifth embodiment, the tripod connecting member is fit in the front cover and abuts against the rear cover. The arrangement, however, can be reversed, with the tripod connecting member fitting in the rear cover and abutting against the front cover.

What is claimed is:

1. A camera comprising:
   a first structural member;
   a second structural member, the second structural member forming a camera casing in combination with the first structural member; and
   a tripod connecting member being separate from the first and second structural members and having a tripod connecting screw portion,
   wherein the first and second structural members comprise a connecting structure for nipping the tripod connecting member with the first and second structural members.

2. The camera according to claim 1, wherein the first structural member comprises a front cover of the camera and the second structural member comprises a rear cover of the camera.

3. A camera including first and second structural members, comprising:
   a first supporting portion provided with the first structural member;
   a second supporting portion provided with the second structural member; and
   a tripod connecting member being separate from the first and second structural members and having a tripod connecting screw portion, the tripod connecting member being positioned in place and supported by engaging the first supporting portion and the second supporting portion;
   wherein the tripod connecting member is nipped and fixed in place by joining the first and second structural members.

4. A camera including a camera body within a camera casing formed by combining front and rear camera casing members, the camera comprising:
   a tripod connecting member being separate from the front and rear camera casing members and having a tripod connecting screw portion, the tripod connecting member being nipped by the front and rear casing members; and a first supporting portion provided with the front camera casing member for supporting the tripod connecting member;

a second supporting portion provided with the rear camera casing member for supporting the tripod connecting member; and a fitting portion provided with the tripod connecting member, the fitting portion including:
- a first fitting member for engaging with the first supporting portion, and
- a second fitting member for engaging with the second supporting portion.

5. A camera including first and second structural members, comprising:

a tripod connecting member being separate from the first and second structural members and having a tripod connecting screw portion;

a first supporting member provided with the first structural member;

a second supporting member provided with the second structural member; and first and second fitting portions provided with the tripod connecting member for engaging with the first and second supporting members, respectively, wherein the first and second supporting members cause the tripod connecting member to be nipped by the first and second structural members.

6. A camera including first and second structural members, comprising:

a tripod connecting member being separate from the first and second structural members and having a tripod connecting screw portion;

a first supporting portion arranged in the first structural member;

a second supporting portion arranged in the second structural member;

a fitting portion provided with the tripod connecting member, the fitting portion being fitted to at least one of the first and second supporting portions; and supporting means for causing the tripod connecting member to be nipped by the first and second supporting portions when combining the first and second structural members.

7. The camera according to claim 6, wherein the fitting portion includes a protruding portion, and at least one of the first and second supporting portions has a recess for receiving the protruding portion therein.

8. The camera according to claim 6, wherein the position of the tripod connecting member is set in lateral and vertical directions by the fitting portion and at least one of the first and second supporting portions, and in a front-to-rear direction by the supporting means.

9. The camera according to claim 6, wherein the tripod connecting screw portion of the tripod connecting member is exposed to the outside of the camera between the first and second structural members.

10. A camera containing a camera body within a camera casing formed by joining front and rear camera casing members, comprising:

a tripod mount being separate from the front and rear camera casing members and having a tripod connecting screw portion and a peripheral surface, the tripod mount being nipped by the front and rear camera casing members;

a protruding portion integrally provided on the peripheral surface of the tripod mount;

a first defining portion provided in the front camera casing member to engage with the protruding portion for defining the position of the tripod mount; and a second defining portion provided in the rear camera casing member to engage with the protruding portion for defining the position of the tripod mount.

11. A camera having a camera casing formed by combining at least first and second camera casing members, the camera comprising:

a tripod connecting member being separate from the first and second camera casing member and having a tripod connecting female screw portion and at least one position defining means for preventing the tripod connecting member from rotating; and a position defining member being provided with at least one of the first and second camera casing members and engaging with the position defining means when the camera casing is formed, wherein a part of the tripod connecting member is exposed to the outside of the camera when the camera casing is completed.

12. The camera according to claim 11, wherein the first and second camera casing members are formed of a plastic material.

13. The camera according to claim 11, wherein the tripod connecting member is nipped by the first and second camera casing members.

14. A mount device having a threaded screw hole for mounting a peripheral device by screwing a male screw from the peripheral device into the threaded screw hole, the mount device comprising:

a plurality of casing members to be combined with each other for forming a casing of the device; and a screw connecting member being separate from the plurality of casing members and having the threaded screw hole therein, wherein the plurality of casing members restrict the position and rotation of the screw connecting member and support the screw connecting member when the plurality of casing members are combined to form the casing of the device.

15. The device according to claim 14, wherein each of the plurality of casing members is formed of a plastic material.

16. The device according to claim 14, wherein the screw connecting member is nipped by the plurality of casing members.

17. A camera comprising:

a camera body;

a tripod mounting member separate from the camera body; and two case members for enclosing the camera body and for nipping and supporting the tripod mounting member without using other fixing means.

18. The camera according to claim 17, wherein the tripod member has a threaded screw hole formed therein.

19. The camera according to claim 17, wherein one of the two case members is a front cover and the other is a rear cover.

20. A camera comprising:

a camera body;

a tripod mounting member separate from the camera body; and casing means for encasing the camera body, the casing means including a first casing member for covering at least a part of the camera body, and a second casing member for covering a remainder of the camera body, wherein the tripod mounting member is nipped and supported by the first and second casing members without using other fixing means.

21. The camera according to claim 20, wherein the tripod member has an inner threaded screw hole for engaging a tripod.

22. A camera comprising:

a camera body;

a tripod connecting screw member separated from the camera body; and a plurality of camera casing members for covering at least a part of the camera body and for fixing and supporting the tripod connecting screw member together with the camera body without using other fixing means.

* * * * *